(12) United States Patent
Hsieh

(10) Patent No.: US 6,311,581 B1
(45) Date of Patent: Nov. 6, 2001

(54) AUTOMATIC OPTICAL FIBER STRIPPING MACHINE WITH STRIPPING LENGTH CONTROL MEANS

(76) Inventor: Chao-Jen Hsieh, 7F-1, No. 92, Pao-Chung Rd., Hsin-Tien (TW)

( * ) Notice: Subject to any disclaimer, the term of this patent is extended or adjusted under 35 U.S.C. 154(b) by 0 days.

(21) Appl. No.: 09/666,290

(22) Filed: Sep. 21, 2000

(51) Int. Cl.$^7$ .................................................. H02G 1/12
(52) U.S. Cl. ............................. 81/9.51; 81/9.41; 30/90.1
(58) Field of Search .................... 81/9.51, 9.41, 81/9.42, 9.43, 9.44; 30/90.1

(56) References Cited

U.S. PATENT DOCUMENTS

| 3,765,276 | * | 10/1973 | Pollitt | 81/9.51 |
| 4,614,135 | * | 9/1986 | Ito et al. | 81/9.51 |
| 4,961,357 | * | 10/1990 | Butler et al. | 81/9.51 |
| 4,969,703 | * | 11/1990 | Fyfe et al. | 350/96.2 |
| 5,067,379 | * | 11/1991 | Butler et al. | 83/13 |
| 5,457,877 | * | 10/1995 | McDermott | 29/825 |
| 5,896,786 | * | 4/1999 | Akita | 81/9.41 |
| 5,934,161 | * | 8/1999 | Keene | 81/9.51 |
| 6,023,366 | * | 3/2000 | Tominaga et al. | 30/90.1 |
| 6,052,880 | * | 4/2000 | Basavanhally | 29/33.5 |
| 6,176,155 | * | 1/2001 | Palmowski et al. | 81/9.51 |

FOREIGN PATENT DOCUMENTS 2 173 353-A * 10/1986 (GB) ................................ 81/9.51

* cited by examiner

Primary Examiner—James G. Smith
Assistant Examiner—Hadi Shakeri
(74) Attorney, Agent, or Firm—Bacon & Thomas, PLLC

(57) ABSTRACT

The invention relates to an automatic optical fiber stripping machine and, more particularly, to an automatic optical fiber stripping machine, which is practical for stripping optical fibers of different diameters efficiently. The automatic optical fiber stripping machine helps the user obtain the desired length of bared glass core for further standardized coupler, optical passive component manufacturing, and accurately strips optical fibers of different diameters without damaging the glass core.

10 Claims, 3 Drawing Sheets

AUTOMATIC OPTICAL FIBER STRIPPING MACHINE WITH STRIPPING LENGTH CONTROL MEANS

BACKGROUND OF THE INVENTION

1. Field of the Invention

The present invention relates to wire strippers and, more particularly, to an automatic optical fiber stripping machine with stripping length control means adapted to strip an intermediate portion of optical fiber cables of different diameters.

2. Description of Related Art

Currently, labor and a hand tool achieve the task of stripping off the shell of an optical fiber. FIG. 1 illustrates a wire stripper for this purpose. The wire stripper 91 comprises two arched notches 911 and 912 respectively provided at two jaws thereof and adapted to hold down an optical fiber. When the user pulls the optical fiber after the wire stripper 91 has been secured to the arched notches 911 and 912, the shell of the optical fiber is stripped off. U.S. Pat. No. 6,089,125 discloses a combination wire stripper having a similar but more complicated structure which is operated by hands. Since it is difficult to control the applied force accurately, it is difficult to obtain a specific length of the bared glass core as desired. As a result, there is a tendency to damage the glass core when stripping the shell. U.S. Pat. No. 5,140,873 discloses another wire stripper driven by a motor, however, it is used to semi-strip and expose one end of a wire but not a middle section thereof.

SUMMARY OF THE INVENTION

The main object of the present invention is to provide an automatic optical fiber stripping machine, which achieves obtaining the desired length of bared glass core to facilitate further coupling or distribution procedure.

Another object of the present invention is to provide an automatic optical fiber stripping machine, which accurately strips an intermediate portion of optical fibers of different diameters without damaging the glass core, so as to prevent further coupler or other optical passive component fabrication loss.

To achieve the aforesaid objects, the automatic optical fiber stripping machine of the present invention comprises a table, a carriage, a carriage controller adapted to move the carriage controller on the table, chuck means mounted on the carriage and adapted to hold down an optical fiber for stripping, and a cutter unit mounted on the table and adapted to strip the shell of the optical fiber being secured to the chuck means when the optical fiber is moved with the chuck means and the carriage on the table. Each chuck can be comprised of a fixed block fixedly mounted on the carriage, and a sliding block controlled by a sliding block controller to move relative to the fixed block. The cutter unit comprises a fixed metal cutter fixedly mounted on the table, and a sliding metal cutter controlled by a sliding cutter controller to move relative to the fixed metal cutter. The carriage controller, the sliding block controller and the sliding cutter controller can be air cylinders, hydraulic cylinders, or any of equivalent reciprocating control means. The at least one chuck can be mounted on the carriage at two opposite sides of the cutter unit. Alternatively, the at least one chuck can be mounted on the carriage and spaced from the cutter unit at one side. The carriage is moved to carry the at least one chuck to a distance relative to the cutter unit, and the shell of the optical fiber is stripped off at the desired length.

Other objects, advantages, and novel features of the invention will become more apparent from the following detailed description when taken in conjunction with the accompanying drawings.

DETAILED DESCRIPTION OF THE PREFERRED EMBODIMENT

Figure 1:
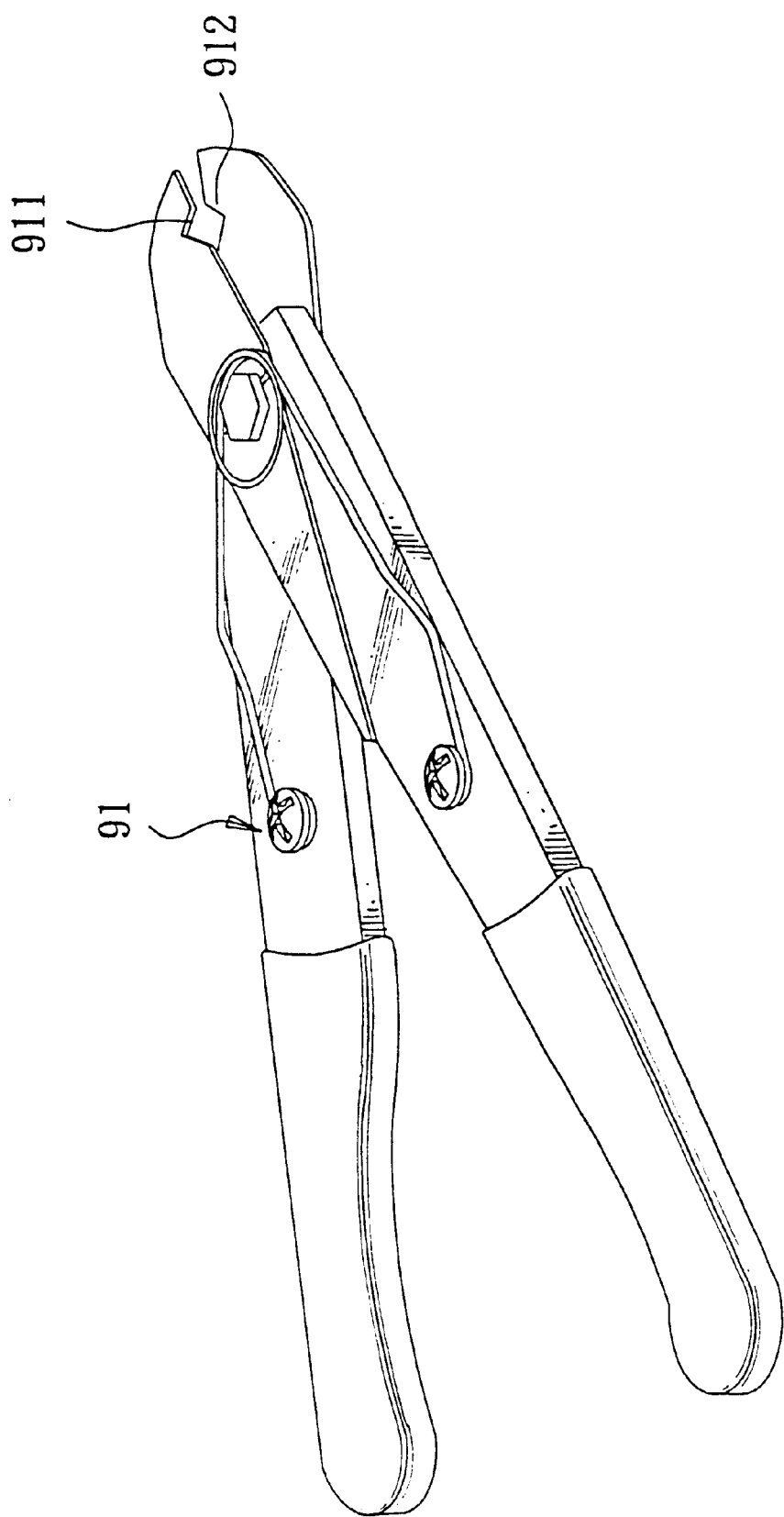
FIG. 1 is a perspective view of a conventional wire stripper.
Figure 2:
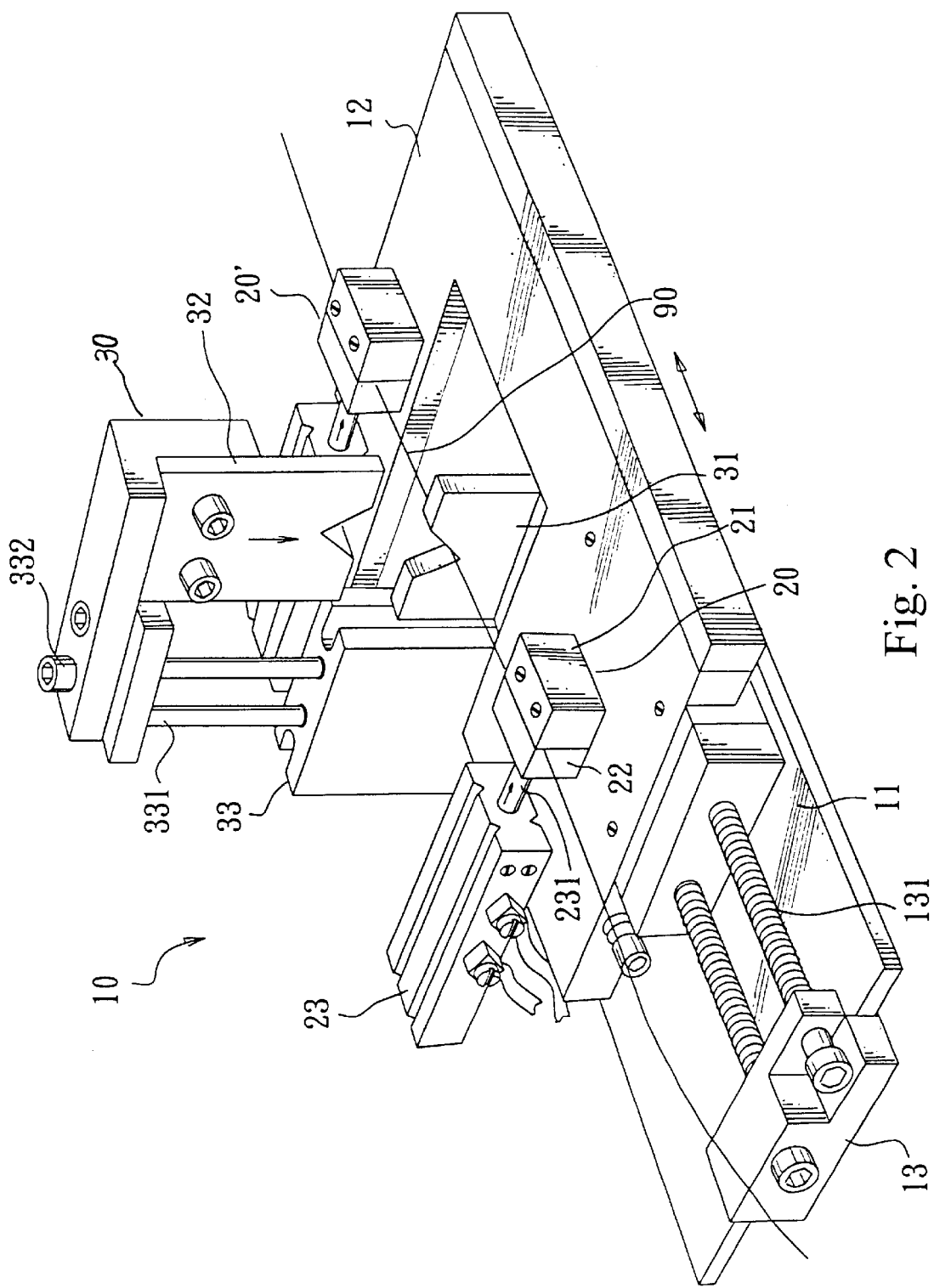
FIG. 2 is a perspective view of an automatic optical fiber stripping machine according to the present invention.
Figure 3:
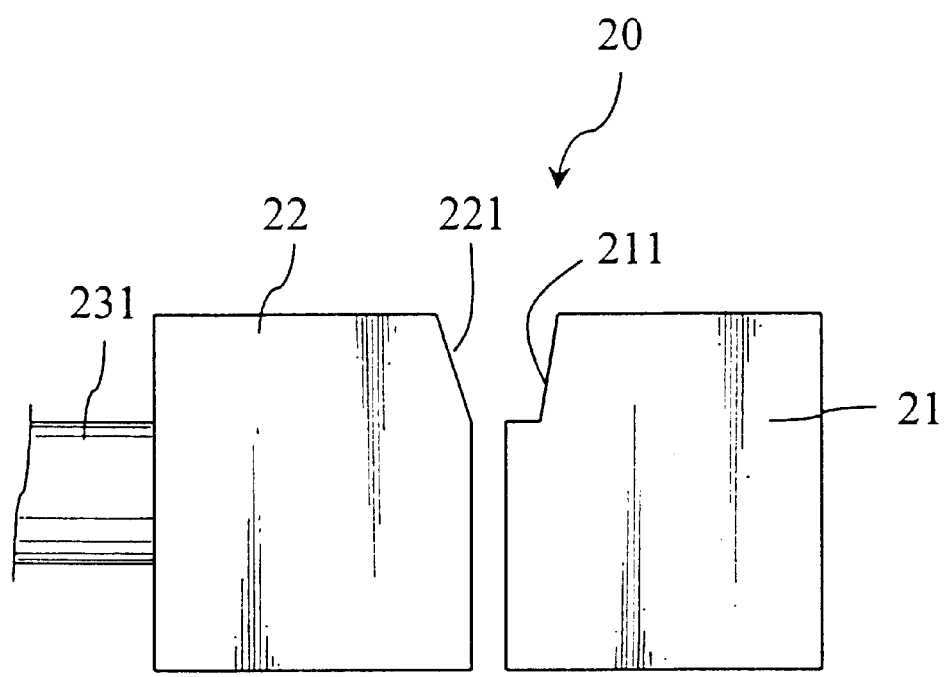
FIG. 3 is a side view in an enlarged scale of a part of the present invention, showing the structure of the chuck.

With reference to FIG. 2, there is shown an automatic optical fiber stripping machine 10 constructed according to the present invention. The automatic optical fiber stripping machine 10 comprises a carriage 12, and two chucks 20 and 20' mounted on the carriage 12. The chucks 20 and 20' each comprise a fixed block 21 and a sliding block 22. As illustrated in FIG. 3, the fixed block 21 has a shoulder 211 disposed at its one side facing the sliding block 22. The sliding block 22 has a beveled face 221 disposed at its one side facing the shoulder 211 of the fixed block 21. After the sliding block 22 had been moved to the fixed block 21, the shoulder 211 and the beveled face 221 define a gap adapted to hold down an optical fiber 90 between the fixed, block 21 and the sliding block 22. A sliding block controller 23 is provided having a reciprocating rod 231 connected to one side of the sliding block 22 opposite to the fixed block 21. The sliding block controller 23 can be, for example, an air cylinder, which is controlled to move the reciprocating rod 231 forwards or backwards, so as to further move the sliding block 22 to or apart from the fixed block 21. The carriage 12 is slidably mounted on a table 11. A carriage controller 13 is arranged to move the carriage 12 in a predetermined direction with respect to the table 11. The carriage controller 13 comprises an adjustment screw 131 adapted to adjust moving the travel distance of the carriage 12 with respect to the table 11. The carriage controller 13 can be, for example, an air cylinder.

A cutter unit 30 is fixedly mounted on the table 11, comprising a fixed cutter 31 with a substantially V-shaped cutting edge, a sliding metal cutter 32 with a substantially inverted V-shaped cutting edge relative to the fixed metal cutter, a sliding cutter controller 33 adapted to move the sliding cutter 32 relative to the fixed cutter 31, and an adjustment device 332 adapted to control the moving distance of the sliding cutter 32 relative to the fixed cutter 31. The fixed cutter 31 and the sliding cutter 32 are made of metal. The sliding cutter controller 33 comprises a reciprocating rod 331 connected to the sliding cutter 32. The sliding cutter controller 33 can be, for example, an air cylinder. After the sliding cutter 32 has moved to the fixed cutter 31, a quadrilateral hole is defined in between the fixed cutter 31 and the sliding cutter 32 to hold down the optical fiber 90, and at this time the pitch between the fixed cutter 31 and the sliding cutter 32 can be adjusted by means of the pitch adjustment device 332, for example, the vertical pitch between two opposite sides of the quadrilateral hole can be adjusted to 90.5 $\mu$m in case the glass core of the optical fiber 90 is 90 $\mu$m.

In operation, an optical fiber 90 is clamped by the chucks 20, 20'. The optical fiber 90 passes through the V-shaped cutting edge of the fixed cutter 31. The sliding cutter 32 is moved downward towards the optcal fiber 90 so that the optical fiber 90 passes through the V-shaped cutting edge of the sliding cutter 32. The fixed cutter 31 and the sliding cutter 32 cooperate to cut the shell of the optical fiber 90. When the machine 10 is activated, the carriage 12 moves along the axis of the lamped optical fiber 90 so as to strip an intermediate portion of the optical fiber 90 corresponding to the distance of the travel of the carriage 12 with respect to the table 11.

In other words, a localized portion of the optical fiber 90 is exposed to reveal a glass core and the length of the exposure directly corresponds to the distance of the carriage 12 travel. Subsequently, the stripped shell portion is bunched between the cutter unit 30 and one of the chuck units 20, 20' depending upon the direction of the travel of the carriage 12. Because the cutters 31 and 32 of the cutter unit 30 cut only the shell of the optical fiber 90, the glass core is maintained intact.

Although the present invention has been explained in relation to its preferred embodiment, it is to be understood that many other possible modifications and variations can be made without departing from the spirit and scope of the invention as hereinafter claimed.

What is claimed is:

1. An automatic optical fiber stripping machine adapted to strip an intermediate portion of an optical fiber having a shell, comprising:

a table;

a carriage slidably mounted onto said table for movement in a wire stripping direction with respect to said table;

a carriage controller provided to said carriage;

a cutter unit mounted on said table and adapted to cut the shell of said optical fiber;

a pair of chuck units mounted on said carriage on opposite sides of said cutter unit along said wire stripping direction, said pair of chuck units arranged to clamp and retain an optical fiber;

wherein said carriage controller is arranged to drive said carriage a predetermined distance in said wire stripping direction with respect to said table so that said pair of chuck units carry said optical fiber said predetermined distance with respect to said cutter unit to execute intermediate stripping of said optical fiber.

2. The automatic optical fiber stripping machine as claimed in claim 1 wherein said carriage controller is an air cylinder.

3. The automatic optical fiber stripping machine as claimed in claim 1 wherein said carriage controller comprises adjustment means adapted to set said predetermined travel distance of said carriage.

4. The automatic optical fiber stripping machine as claimed in claim 1 wherein each chuck unit comprises a fixed block and a sliding block, and at least one sliding block controller to move the sliding block relative to said fixed block.

5. The automatic optical fiber stripping machine as claimed in claim 4 wherein said sliding block controller comprises an air cylinder.

6. The automatic optical fiber stripping machine as claimed in claim 1 wherein said cutter unit comprises two metal cutters, said metal cutters including a fixed metal cutter and a sliding metal cutter, and a controller adapted to move said sliding metal cutter relative to said fixed metal cutter.

7. The automatic optical fiber stripping machine as claimed in claim 6 wherein the controller of said cutter unit is an air cylinder.

8. The automatic optical fiber stripping machine as claimed in claim 6 wherein the controller of said cutter unit further comprises an adjustment means adapted to set said sliding metal cutter a predetermined distance from said fixed metal cutter.

9. The automatic optical fiber stripping machine as claimed in claim 6 wherein said fixed metal cutter has a substantially V-shaped cutting edge and said sliding metal cutter has a substantially inverted V-shaped cutting edge relative to said fixed metal cutter.

10. The automatic optical fiber stripping machine as claimed in claim 6 wherein said fixed metal cutter and said sliding metal cutter have vertically aligned cutting edges.

* * * * *